(12) United States Patent
Limatoc

(10) Patent No.: US 9,194,421 B2
(45) Date of Patent: Nov. 24, 2015

(54) ONE-PIECE SELF-LOCKING NUT

(71) Applicant: Arnold Permanent Nut, LLC, Aiea, HI (US)

(72) Inventor: Arnold Limatoc, Aiea, HI (US)

(73) Assignee: Arnold Permanent Nut, LLC, Aiea, HI (US)

( * ) Notice: Subject to any disclaimer, the term of this patent is extended or adjusted under 35 U.S.C. 154(b) by 239 days.

(21) Appl. No.: 13/916,532

(22) Filed: Jun. 12, 2013

(65) Prior Publication Data
US 2014/0286727 A1 Sep. 25, 2014

Related U.S. Application Data

(60) Provisional application No. 61/804,693, filed on Mar. 24, 2013.

(51) Int. Cl.
*F16B 39/34* (2006.01)
*F16B 39/286* (2006.01)

(52) U.S. Cl.
CPC ............... *F16B 39/34* (2013.01); *F16B 39/286* (2013.01)

(58) Field of Classification Search
CPC ............................... F16B 39/34; F16B 39/286
USPC ......................................................... 411/285
See application file for complete search history.

(56) References Cited

U.S. PATENT DOCUMENTS

| 2,286,336 | A | * | 6/1942 | Brooke | 411/302 |
| 2,320,785 | A | * | 6/1943 | Luce | 411/285 |
| 2,381,110 | A | * | 8/1945 | Chandler | 411/280 |
| 2,390,726 | A | * | 12/1945 | Mitchell | 411/302 |
| 2,529,093 | A | * | 11/1950 | Luce | 411/285 |
| 3,129,742 | A | * | 4/1964 | Gunther et al. | 411/213 |
| 3,522,830 | A | * | 8/1970 | Blizard | 411/303 |
| 4,019,550 | A | * | 4/1977 | DeHaitre | 411/303 |
| 6,881,019 | B2 | | 4/2005 | Wolf | |
| 8,087,863 | B2 | * | 1/2012 | Flaig | 411/277 |

FOREIGN PATENT DOCUMENTS

JP  2005-069254  2/2005

OTHER PUBLICATIONS

PCT US2014/041272, filed Jun. 6, 2014, Limatoc, International Search Report.

* cited by examiner

*Primary Examiner* — Gary Estremsky
(74) *Attorney, Agent, or Firm* — Leighton K. Chong

(57) ABSTRACT

A one-piece, self-locking nut is formed with a threaded nut body integrally formed with crush-locking lips on a forward contact face of the nut body spaced by an internal relief cut for accommodating deformation of the crush-locking lips therein. When the nut is tightened down on an object on a fastener bolt, the crush-locking lips are forced inwardly and deformed on the threaded shaft of the fastener bolt into the space of the internal relief cut in order to form a permanent lock on the fastener bolt. The one-piece, self-locking nut can be fabricated by conventional nut manufacturing methods. In use it threads on quickly like a conventional nut and installs with conventional tools.

6 Claims, 9 Drawing Sheets

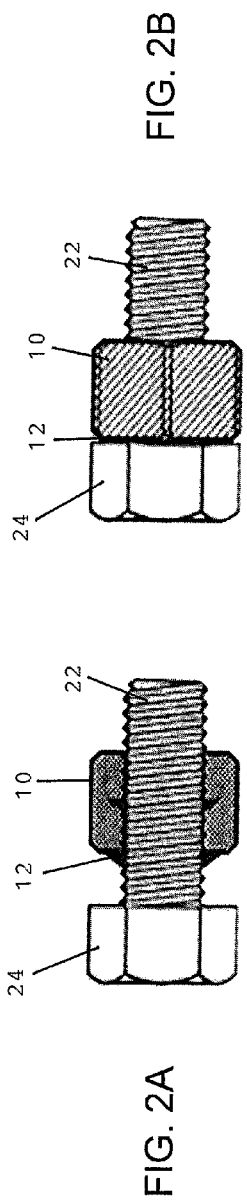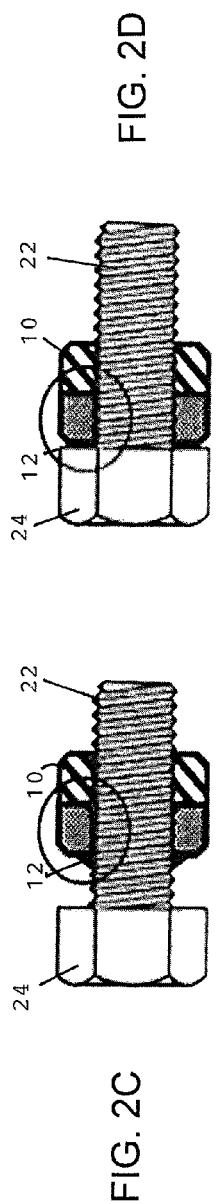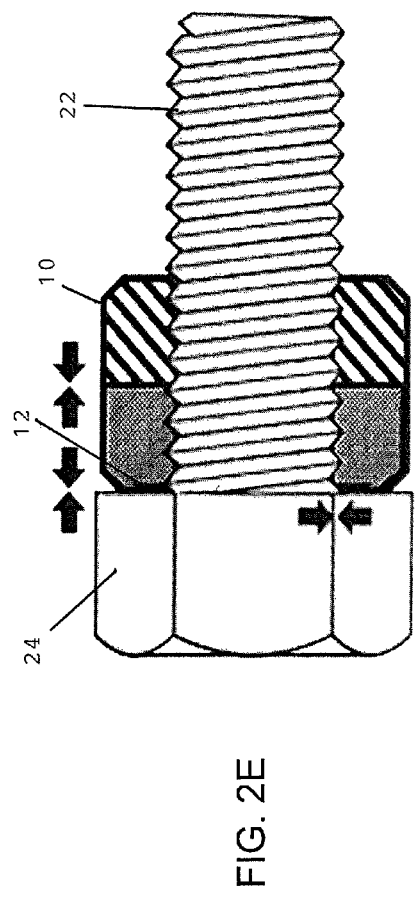
FIG. 2A  FIG. 2B  FIG. 2C  FIG. 2D  FIG. 2E

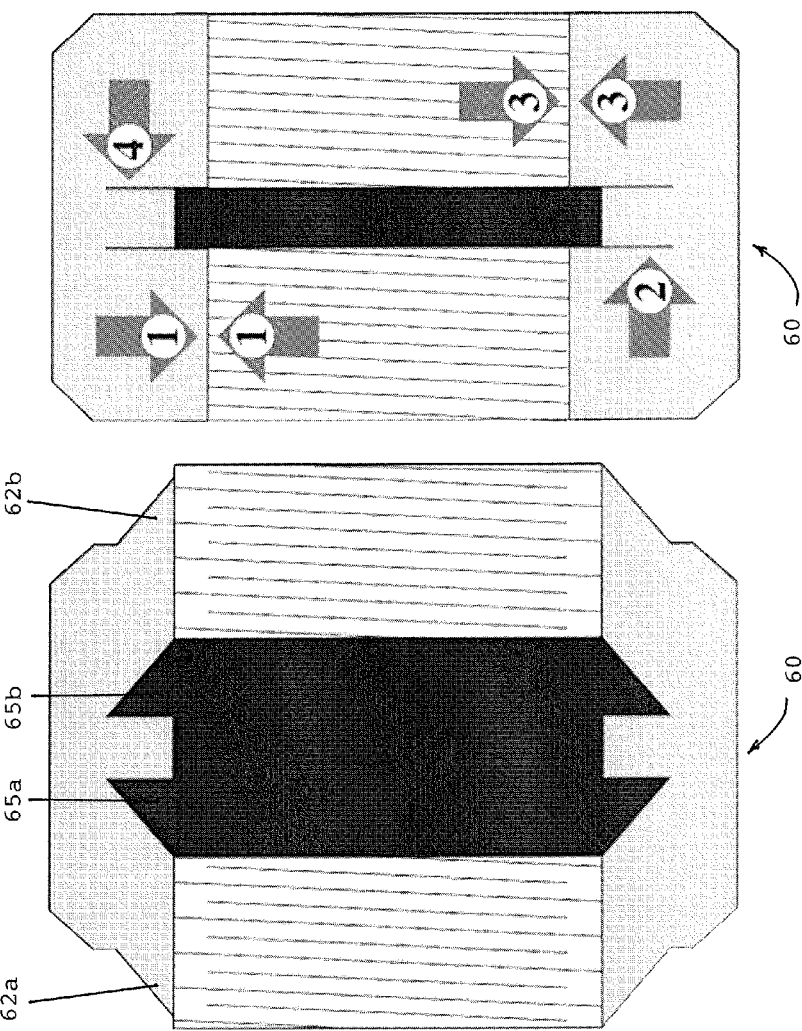

9,194,421 B2

ONE-PIECE SELF-LOCKING NUT

This U.S. patent application claims the priority filing date of U.S. Provisional Application 61/804,693 filed on Mar. 24, 2013, by the same inventor as in the present application.

TECHNICAL FIELD

The present U.S. patent application relates to a threaded nut for fastening on a threaded bolt of any size, pitch, type or material depending on usage specifications and demands.

BACKGROUND OF INVENTION

In many applications, it is desirable to have a threaded nut fastened on a threaded bolt with a permanent hold that will not loosen when exposed to high vibration environments. Conventionally, one or more locknuts may be fastened on the bolt behind the threaded nut to apply a locking force on the threaded nut to prevent it from loosening. However, the conventional use of locknuts requires added components to be used and manipulated with every permanent fastener, thereby taking up more time and material, and such locknuts may still be subject to loosening over time in high vibration environments.

SUMMARY OF INVENTION

It is therefore a principal object of the present invention to provide a one-piece self-locking nut for permanent fastening on a bolt that can be readily fabricated with standard manufacturing methods and installed on a bolt with standard tools. It is a further object that the one-piece self locking nut be easier and less expensive to manufacture, and lighter, stronger, and quicker to install than two-piece (or more) locking nuts.

In a preferred embodiment of the invention, a one-piece, self-locking nut is comprised of a nut body having internal threading for threading on a threaded shaft of a fastener bolt, and being integrally formed with circumferentially arranged, crush-locking lips provided on a forward contact face of the nut body and spaced from the internal threading of the nut body by an internal relief cut for accommodating deformation of the crush-locking lips therein, wherein when the nut is tightened down on an object on which the fastener bolt is used, the crush-locking lips are forced inwardly and deform on the threaded shaft of the fastener bolt and into the space of the internal relief cut in order to form a permanent lock on the fastener bolt.

When torqued down onto a fastener bolt, the one-piece, self-locking nut resembles a conventional nut in the locked position while forming a permanent lock, whereas the conventional nut is subject to loosening. The one-piece, self-locking nut can be fabricated by conventional nut manufacturing methods, and in use it threads on quickly like a conventional nut and installs with conventional tools. The self-locking nut installs faster and is lighter in weight without wasting added material as compared to two-piece locking nuts.

Other preferred variations of the one-piece, self-locking nut in the present invention include a version with slotted crush-locking lips, a version with two-sided crush-locking lips, a version with equalized two-sided crush-locking lips, a version with crush-locking lips of different material than the nut body, and a version with flanged crush-locking lips.

Other objects, features, and advantages of the present invention will be explained in the following detailed description having reference to the appended drawings.

BRIEF DESCRIPTION OF DRAWINGS

FIGS. 2A-2E are sectional views illustrating how the crush-locking lips of the one-piece, self-locking nut are forced inwardly to deform on the threaded shaft of a fastener bolt in order to form a permanent lock.

FIGS. 6A-6B illustrate a version of the one-piece, self-locking nut having equalized two-sided crush-locking lips.

DESCRIPTION OF PREFERRED EMBODIMENTS

In the following detailed description of the invention, certain preferred embodiments are illustrated providing certain specific details of their implementation. However, it will be recognized by one skilled in the art that many other variations and modifications may be made given the disclosed principles of the invention.

Figure 1B:
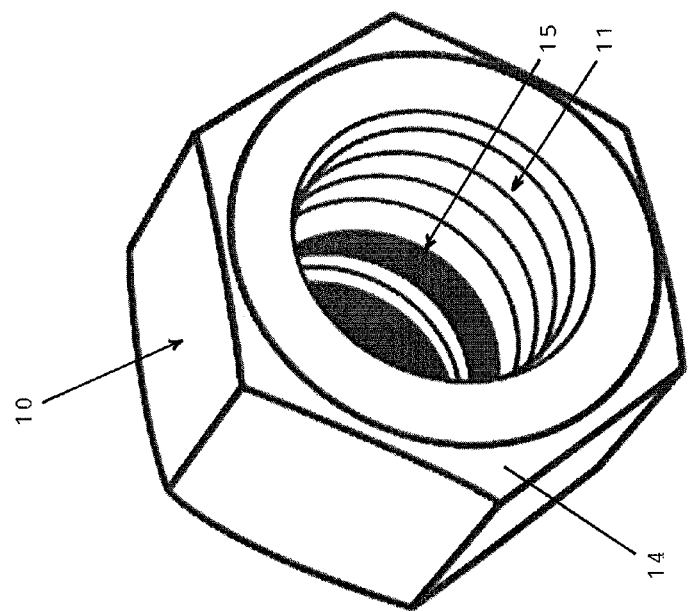
FIG. 1B is a rear perspective view thereof.
Figure 1A:
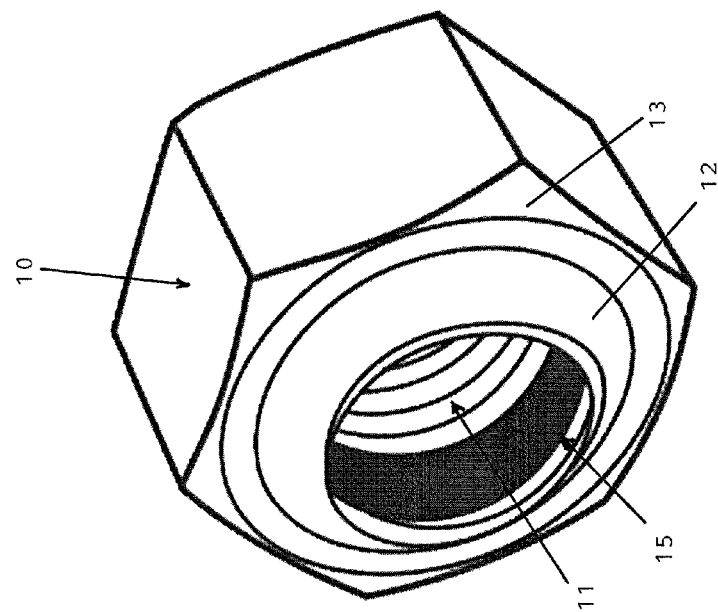
FIG. 1A is a front perspective view of a preferred embodiment of the one-piece, self-locking nut in accordance with the represent invention.

FIG. 1A is a front perspective view of a preferred embodiment of the one-piece, self-locking nut in accordance with the represent invention, and FIG. 1B is a rear perspective view thereof. The one-piece, self-locking nut has a nut body 10 with internal threading 11 for threading on a threaded shaft of a fastener bolt, and is integrally formed with external, crush-locking lips 12 provided on a forward contact face 13 of the nut body 10. The forward contact face 13 of the nut is typically beveled or provided with a slight convex curvature, while the rear face 14 of the nut is typically planar. The dark area 15 indicates a space for deformation of the crush-locking lips 12. When the nut is tightened down on an object on which the fastener bolt is used, the external, crush-locking lips 12 are forced inwardly and deform on the threaded shaft of the fastener bolt toward the internal threading 11 of the nut body in order to form a permanent lock on the fastener bolt.

FIGS. 2A-2E are sectional views illustrating how the crush-locking lips of the one-piece, self-locking nut are forced inwardly to deform on the threaded shaft of a fastener bolt in order to form a permanent lock. In FIG. 2A, the one-piece, self-locking nut 10 crush-locking lips 12 is threaded on a threaded shaft 22 of a fastener bolt toward an object to be permanently fastened. In the figures, the object to be fastened is not shown, and the bolt head 24 is used for illustration. In FIG. 2B, the nut is torqued down on the fastener head 24 (object) causing the crush-locking lips 12 to deform inwardly toward the other threads of the nut body 10. In FIG. 2C, the nut is shown partially in section before it is torqueing down, and FIG. 2D shows the nut after torqueing down. FIG. 2E is an enlarged view showing the nut in permanent locking position, with the horizontal sets of arrows indicating the compressive forces between the internal side of the crush-locking lips and the nut body and between the external side of the crush-locking lips and the fastener head 24 (object) that keep the nut in the permanent locking position. The vertical arrows indicate the torqueing forces on the nut.

Figure 3:
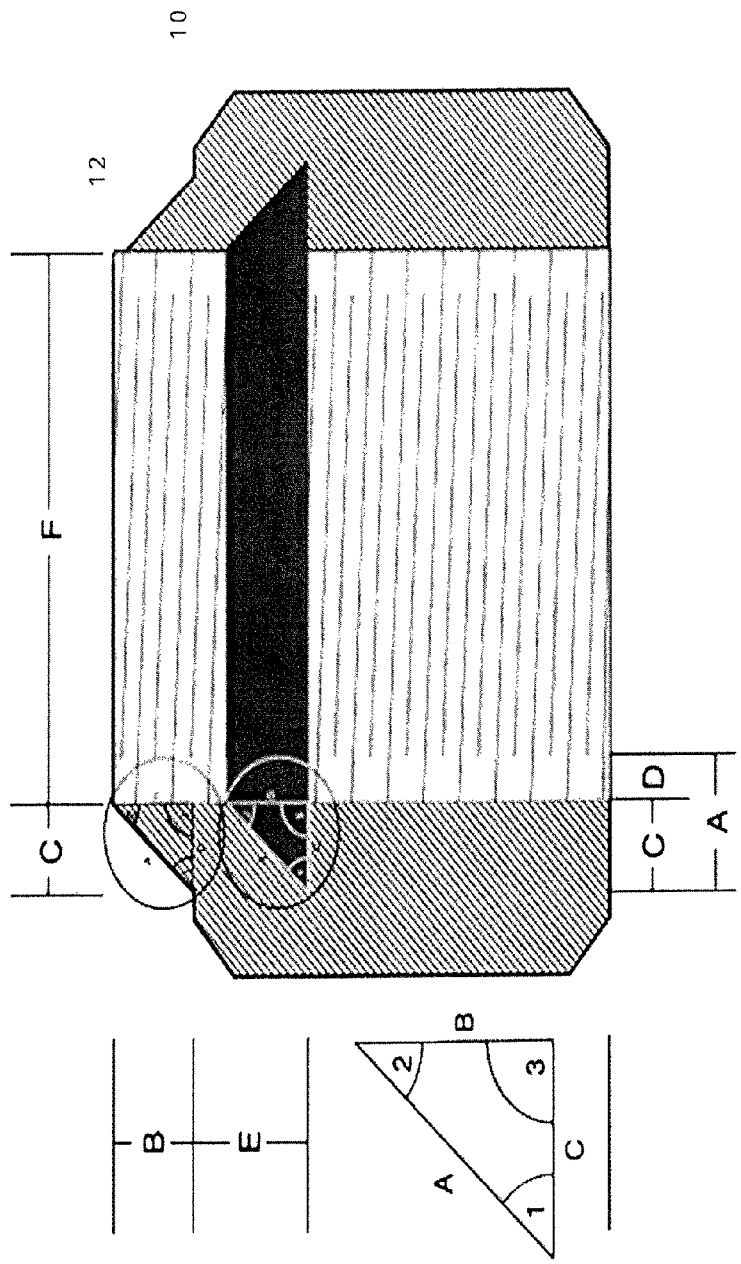
FIG. 3 illustrates the preferred geometry and dimensions for the one-piece, self-locking nut.

FIG. 3 illustrates a preferred geometry and dimensions for the one-piece, self-locking nut. The crush-locking lips 12 on the forward face of the nut body 10 may be of isosceles right-triangular cross-section arranged circumferentially around internal threading 11. The triangular cross-section may have right angle #3=90°, and corner angles #1 & #2=45°. The base width C is approximately equal to the height B of the crush-locking lips 12. The base width may be about 50% of the width of the walls of the nut body 10. The hollow space 14 for deformation of the crush locking lips 12 may be similarly dimensioned to accommodate the deformation of the crush-locking lips 12 with internal threading 11 therein. The pitch depth of the threading is indicated as D, and the combined dimensions of the base width C and the pitch depth D should be approximately equal to the hypotenuse length A of the crush-locking lips 12 to accommodate its deformation therein. The deformation distance from the crush-locking lips to the space 14 is indicated as E, which may be +/−10% to 20% of the nut height. The deeper the internal relief cut, the more vibration resistance the nut provides. The inner diameter of the nut threading 11 is indicated to be F. The nut is preferably made of a metal material such as type 304 stainless steel, grade 2, super alloy.

As an example, the self-locking nut of half inch diameter threading at 20 tpi, made of type 304 stainless steel, would have a target maximum torque of 120 ft/lbs, for applying about 10,000 lbs of compression pressure, and about 7,500 lbs of clamp force. In this example the thickness of the lip material must fully collapse/seat at 8000 lbs to 9000 lbs of pressure. If the external self-locking lip does not fully seat at the desired pressure, the thickness of the external self-locking lip must be reduced until it does.

The self-locking nut may be made of any standard nut materials including brass, steel, stainless steel, titanium, plastic, nylon and other materials depending on usage specifications and demands. The self-locking nut may be manufactured using conventional nut manufacturing methods, such as cutting/turning on a lathe from a single piece of material, hot forming or forging, cold forming, and/or computer-controlled or automated methods of manufacture including 3D printing.

The one-piece self-locking nut functions like two nut portions, one a "regular nut" body and the other a thinner "jam nut" with crush-locking lips that are combined together. The jam nut functions, in part, like a wavy/crush washer that is attached to the nut body. When torqued into the locked position, the material of the crush-locking lips will be deformed by compression forces into the space of the internal relief cut formed between the two parts. The crush-locking lips carried on the contact face of the nut threads on the bolt shaft like a conventional nut until contact is made with an object to be fastened (the head of the bolt, in the described example). As torque is applied, the crush-locking lips will start to be compressed into the threads of the bolt and the internal relief cut. As more torque is applied to overcome the resistance of the deforming crush-locking lips which is unable to rotate, the gap between the two nut parts begin to close as they are compressed together. The "back nut" is encapsulating the "front nut" which is being pushed into the "back nut" because it is unable to rotate. The "back nut" compression acts like a hydraulic press to push the "front nut" into the internal relief cut.

Once the target maximum torque is applied, the two nut parts seat together completely and the combined unit resembles a conventional nut. Since the "front nut" is locked on to the threads of the bolt, the nut cannot be loosened or removed without cutting the nut and/or the bolt threads. The self-locking nut has more vibrational resistance than two conventional nuts torqued to the bolt against each other, even when welded together. The self-locking nut and also creates clamp forces by the "front nut" pinching the bolt perpendicular to the internal relief cut, and has more clamp strength than a comparable conventional nut because of the self-locking forces.

The one-piece, self-locking nut may be formed in other variations depending of the intended environments of usage.

Figure 4B:
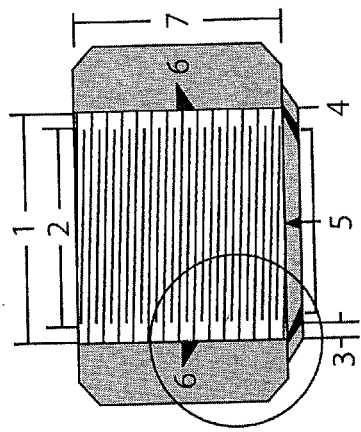
FIGS. 4A-4C illustrate a version of the one-piece, self-locking nut having slotted crush-locking lips.
Figure 4C:
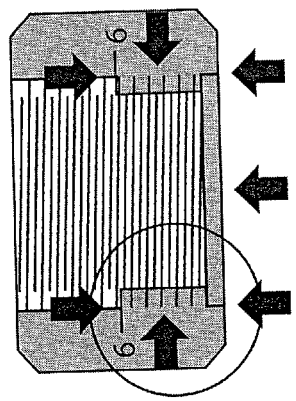
Figure 4A:
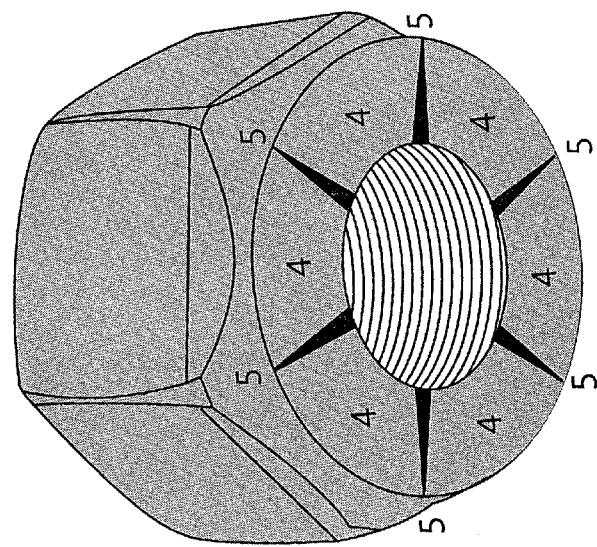

FIGS. 4A-4C illustrate a version of the one-piece, self-locking nut having slotted crush-locking lips. The outer diameter of the bolt it is to be threaded on is indicated by numeral "1". The inner diameter of the nut is indicated by numeral "2", and the difference in diameters being the thread pitch is indicated by numeral "3". The lands of the crush-locking lips are indicated by numeral "4", and the slots in between lands are indicated by numeral "5". The internal relief cut is indicated by numeral "6". The nut body height is indicated by numeral "7". FIG. 4A shows an external perspective view of the forward face of the nut, FIG. 4B shows a sectional view before torqueing, and FIG. 4C shows a sectional view before torqueing. The crush-locking lips may be formed in a star-shaped configuration with six or twelve points to align with the torque edges and/or sides of the typical hex nut. The material and design of the crush-locking lips may change, including shape, height, size, number and shape of relief cuts may vary depending on intended specific application.

Figures 5A, 5B:
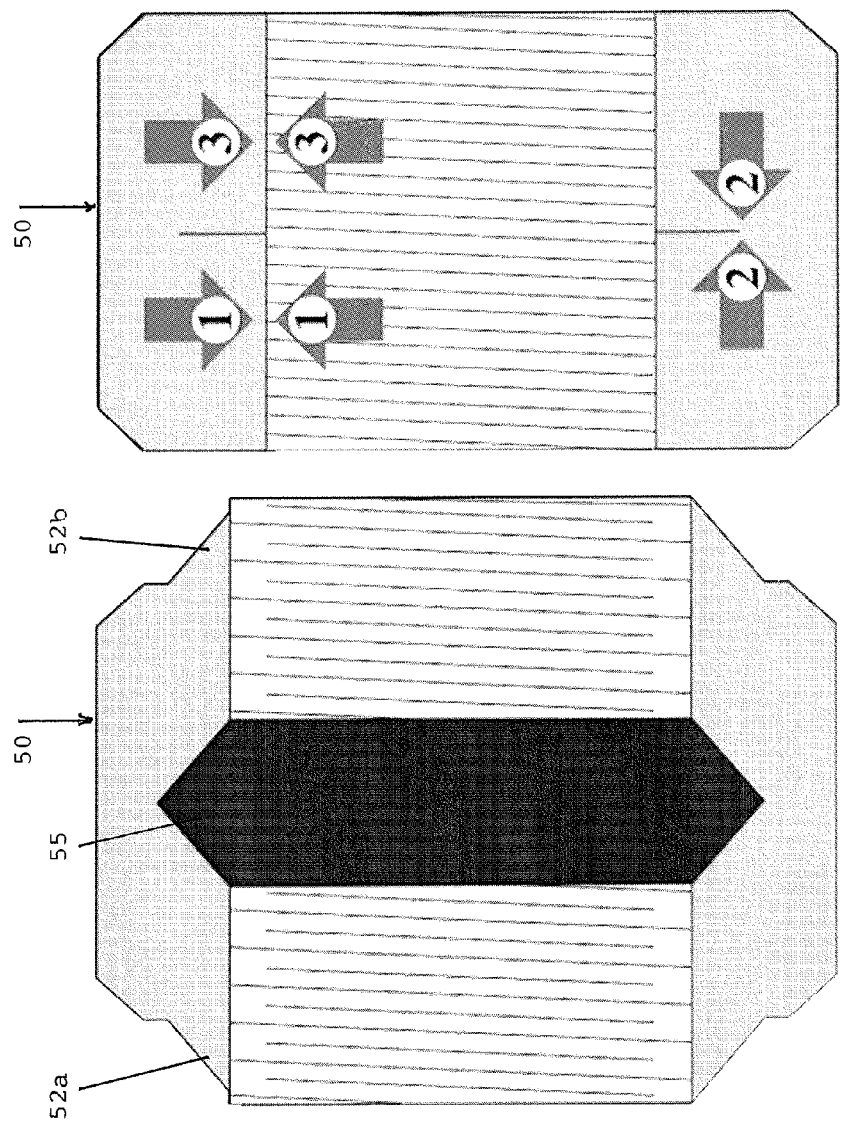
FIGS. 5A-5B illustrate a version of the one-piece, self-locking nut having two-sided crush-locking lips.

FIGS. 5A-5B illustrate a version of the one-piece, self-locking nut having two-sided crush-locking lips. FIG. 5A shows the nut 50 before torqueing, and FIG. 5B shows it after torqueing. Both ends of the nut have self-equalizing locking lips 52a, 52b which share one inner relief cut 55. Torqueing the nut on both ends is self-balancing. Once torqued to specification, the self-locking lips are forced, when the material yields, up into the nut and bolt threads for first direction-locking. Threading in contact on the other side of the bolt shaft provides second direction-locking, thus double-locking. This version may also be formed with standard manufacturing techniques and quickly installs using conventional tools and is easily adaptable to specific applications.

FIGS. 6A-6B illustrate a version of the one-piece, self-locking nut having equalized two-sided crush-locking lips. FIG. 6A shows the nut before torqueing, and FIG. 6B shows it after torqueing. Both ends of the nut have self-equalizing locking lips 62a, 62b, each with its respective inner relief cut 65a, 65b. In effect, it is two self-locking nuts combined in a single nut.

Figure 7A:
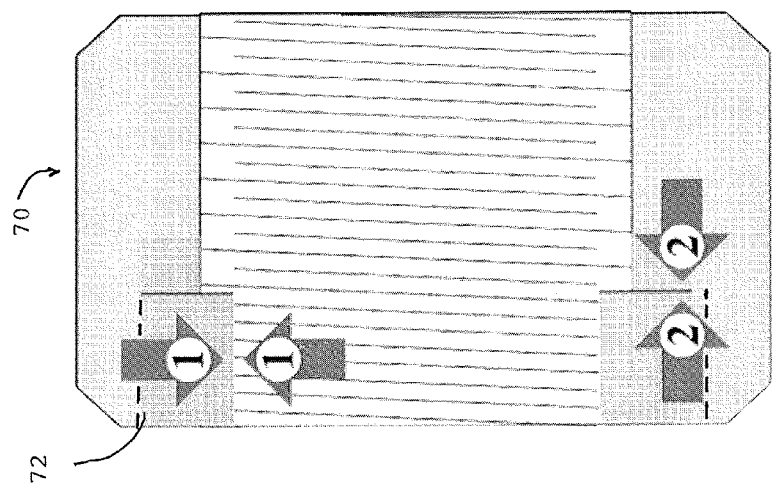
FIGS. 7A-7B illustrate a version of the one-piece, self-locking nut having crush-locking lips made of different material than the nut body.
Figure 7B:
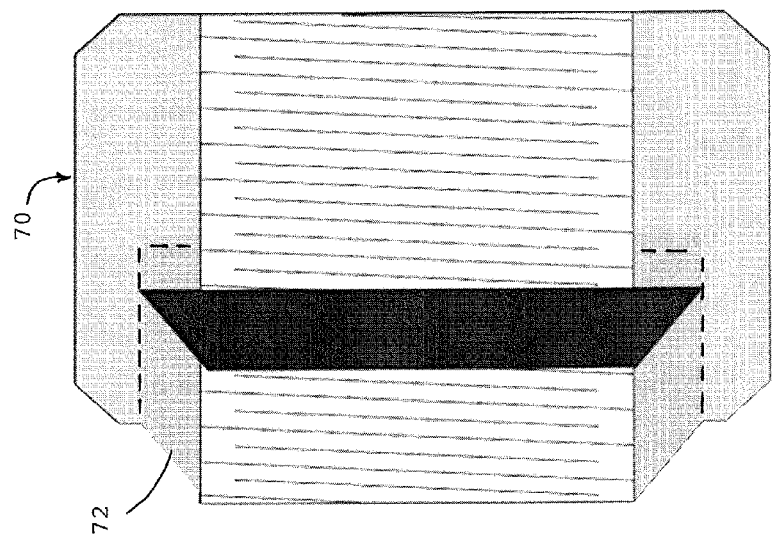

FIGS. 7A-7B illustrate a version of the one-piece, self-locking nut having crush-locking lips made of different material than the nut body. FIG. 7A shows the nut before torqueing, and FIG. 7B shows it after torqueing. The nut body 70 may be made of a high strength material such as steel, while the crush-locking lips 72 may be made of a more readily deformable or ductile metal for more complete locking strength such as brass, for example.

Figure 8A:
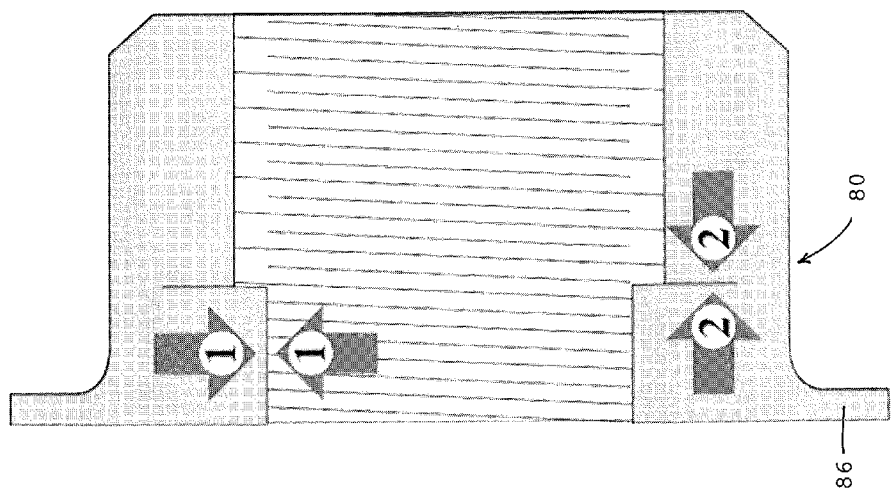
FIGS. 8A-8B illustrate a version of the one-piece, self-locking nut having flanged crush-locking lips.
Figure 8B:
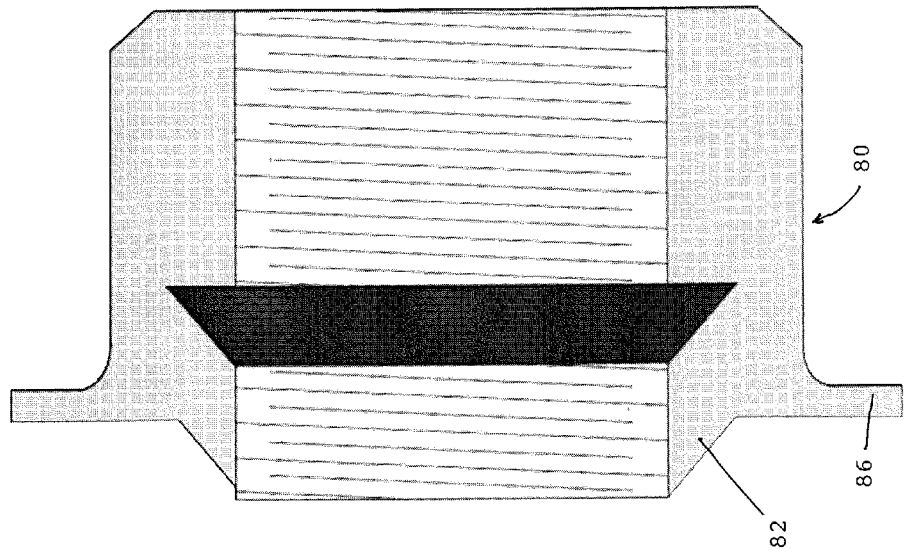

FIGS. 8A-8B illustrate a version of the one-piece, self-locking nut having flanged crush-locking lips. FIG. 8A shows the nut before torqueing, and FIG. 8B shows it after torqueing. The self-locking nut body 80 may be formed with crush-locking lips 82 and built-in flange washer 86. The flange washer may also be provided in the two-sided self-locking and two-sided combined versions.

Figure 9A:
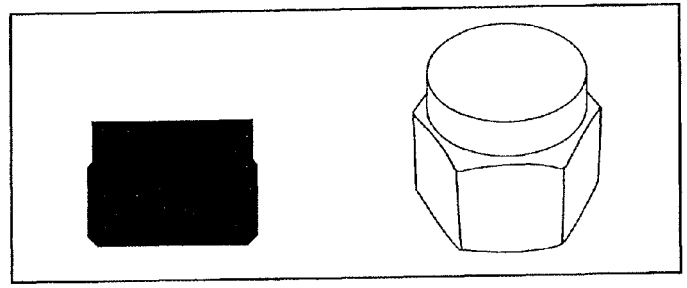
FIGS. 9A-9E illustrate an example of the stages of manufacturing a one-piece, self-locking nut.
Figure 9B:
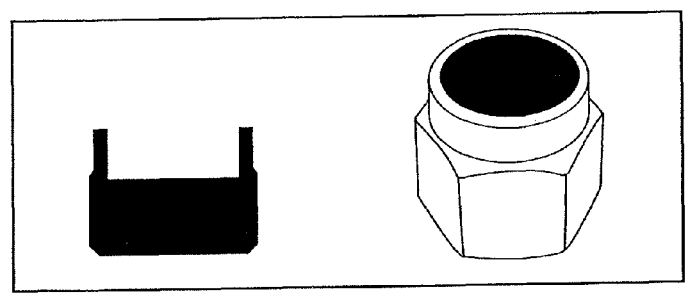
Figure 9C:
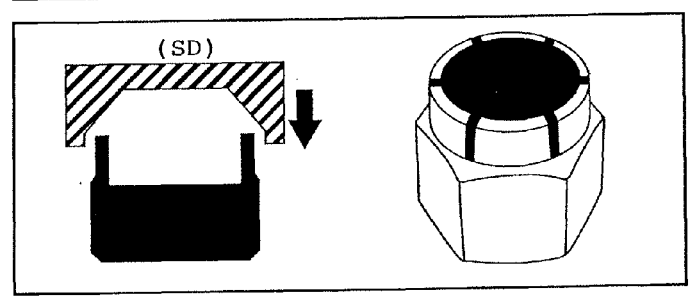
Figure 9D:
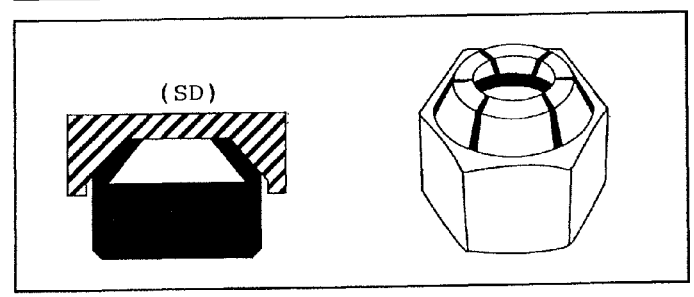
Figure 9E:
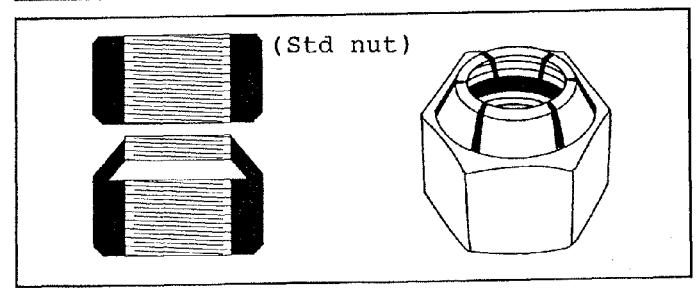

FIGS. 9A-9E illustrate an example of the stages of manufacturing a one-piece, self-locking nut. In FIG. 9A, manufacture starts with a formed (raw) "castle nut" as a base (left side of the figure shows a side cut-away view, and the right side shows a ¾ perspective view). The castle nut is made of solid metal material with no center hole or threads. In FIG. 9B, an inner relief cut (IRC) is drilled or cut into the top of castle nut to form a centered hole. The depth of the hole is determined by the selected external depth of the self-locking lips (SLL) to be formed, and the diameter of the hole is determined by the intended SLL thickness. In FIG. 9C, the SLL is formed by crimping the sides surrounding the hole with a shaping die (SD). In FIG. 9D, the SLL is shown crimped in position. In FIG. 9E, the self-locking nut hole is drilled and tapped in a similar manner as a standard nut ("Std Nut" shown for comparison in the upper part of the left side of the figure).

Once the self-locking nut with formed self-locking lips is installed on a bolt against a fastened object correctly, most of the space between the nut and bolt threads are removed. This changes the nut and bolt threads to almost one piece of material, and is permanent, and will not come loose when exposed to vibration over time. The result is a nut and bolt connection that has superior strength and is permanently vibration resistant. It also has a higher strength-to-weight ratio than conventional locking nuts, although it resembles a conventional nut when in the locked position. Depending on the application, the permanently installed nut would need to be cut-off to be removed.

The one-piece, self-locking nut may replace rivets and welding, depending on application. It is theft-resistant once installed, and may be used for many security applications. Its locking strength can be modified by configuring the depth and position of the inner relief cut and the material(s) used. The one-piece, self-locking nut is also durable in high temperature applications. It is light-weight, weighing the same as a conventional nut, and lighter than current two-piece lock-nuts. It can uses standard thread pitch bolts and studs, metric or U.S., just like conventional nuts. It is faster to install than one and two-piece lock nuts, and threads on with no resistance just like a conventional nut. It uses less material, and is easier and less expensive to produce than two-piece locking nuts.

The one-piece, self-locking nut is suitable for use in extreme, high vibration and security environments that demands reliability, durability, heavy duty or high performance in a lightweight permanent locking nut. Examples of industrial environments where the one-piece, self-locking nut may be used include:

Aerospace
Aviation
Bridges
Buildings
Civil engineering projects
Construction equipment
Dams
Expressways
Extreme environment applications
Guard rails
Heavy duty applications
High vibration applications
Industrial equipment
Machinery
Marine applications
Metal presses
Military equipment
Nuclear power plants
Racing applications
Railroads
Railway cars
Rock crushers
Shipbuilding
Steel-making machinery
Steel towers
Street lights
Traffic lights
Transportation machines It is to be understood that many modifications and variations may be devised given the above description of the general principles of the invention. It is intended that all such modifications and variations be considered as within the spirit and scope of this invention, as defined in the following claims.

The invention claimed is:

1. The self-locking nut comprising:
a rear nut body having internal threading for threading on a threaded shaft of a fastener bolt, and
being integrally formed with a front nut body having circumferentially arranged, crush-locking lips provided on a forward contact face of the front nut body and being spaced from the internal threading of the rear nut body by an internal relief cut for accommodating deformation of the crush-locking lips therein,
wherein when the self-locking nut is tightened down on an object on which the fastener bolt is to be fastened, the crush-locking lips on the forward contact face of the front nut body are forced inwardly and deform on the threaded shaft of the fastener bolt and into the space of the internal relief cut of the front nut body in order to form a permanent lock on the fastener bolt, and
wherein the crush-locking lips on the forward contact face of the front nut body has an isosceles right-triangular cross-section, a base width of the right-triangular cross-section is approximately equal to a height of the right-triangular cross-section of the crush-locking lips.

2. The self-locking nut according to claim 1, wherein the forward contact face of the front nut body is beveled or provided with a slight convex curvature.

3. The self-locking nut according to claim 1, wherein the base width of the cross-section of the crush-locking lips is about 50% of the width of walls of the nut body.

4. The self-locking nut according to claim 1, wherein the space of the internal relief cut is similarly dimensioned as the crush-locking lips to accommodate the deformation of the crush-locking lips therein.

5. The self-locking nut according to claim 1, the front nut body has half inch diameter internal threading at 20 tpi, and is made of type 304 stainless steel, and has a target maximum torque of about 120 ft/lbs, for applying about 10,000 lbs of compression pressure, and about 7,500 lbs of clamp force.

6. The self-locking nut according to claim 1, wherein the front nut body is made of any standard nut materials of the group consisting of: brass, steel, stainless steel, titanium, plastic, nylon, and any combination thereof.

* * * * *